(12) United States Patent
Helland et al.

(10) Patent No.: US 7,169,831 B2
(45) Date of Patent: Jan. 30, 2007

(54) PAVEMENT MARKING COMPOSITION COMPRISING CERAMIC FIBERS

(75) Inventors: Randall H. Helland, Maplewood, MN (US); Eric E. Rice, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 531 days.

(21) Appl. No.: 10/078,771

(22) Filed: Feb. 18, 2002

(65) Prior Publication Data

US 2003/0099512 A1    May 29, 2003

Related U.S. Application Data

(60) Provisional application No. 60/325,279, filed on Sep. 27, 2001.

(51) Int. Cl.
  *F21V 7/22*   (2006.01)
  *C08K 3/22*   (2006.01)
  *E01F 9/093*  (2006.01)

(52) U.S. Cl. ............... 523/172; 524/430; 524/433; 524/442; 404/12; 404/13; 404/14; 428/325

(58) Field of Classification Search ............... 523/172; 404/12, 13, 14; 524/430; 428/297.4, 325
See application file for complete search history.

(56) References Cited

U.S. PATENT DOCUMENTS

| | | | |
|---|---|---|---|
| 3,132,114 A | | 5/1964 | Somigliana |
| 4,117,192 A | | 9/1978 | Jorgensen |
| 4,156,533 A | * | 5/1979 | Close et al. ............... 277/652 |
| 4,282,139 A | * | 8/1981 | Sugio et al. ............... 524/141 |
| 4,282,281 A | | 8/1981 | Ethen |
| 4,317,575 A | * | 3/1982 | Cavicchio ............... 277/650 |
| 4,490,432 A | | 12/1984 | Jordan |
| H000812 H | * | 8/1990 | George ............... 524/444 |
| 5,127,973 A | * | 7/1992 | Sengupta et al. ............... 156/60 |
| 5,185,299 A | | 2/1993 | Wood et al. |
| 5,194,113 A | | 3/1993 | Lasch et al. |
| 5,288,446 A | * | 2/1994 | Noyama et al. ............... 264/108 |
| 5,374,465 A | | 12/1994 | Fulcomer |
| 5,565,514 A | * | 10/1996 | Carlberg ............... 524/494 |
| 5,667,335 A | | 9/1997 | Khieu et al. |
| 6,001,936 A | * | 12/1999 | Barrera et al. ............... 525/454 |
| 6,407,195 B2 | | 6/2002 | Sherman et al. |
| 6,420,607 B1 | | 7/2002 | Hamrock et al. |
| 6,623,704 B1 | * | 9/2003 | Roth ............... 422/179 |

FOREIGN PATENT DOCUMENTS

| | | |
|---|---|---|
| DE | 1943467 | 4/1971 |
| DE | 2241781 | 3/1974 |
| EP | 0041335 | 12/1981 |
| EP | 0232980 | 8/1987 |
| JP | 1023890 | 1/1978 |
| JP | 2000-95972 | 9/1998 |
| WO | WO 95/08426 | 3/1995 |
| WO | WO 99/46447 | 9/1999 |
| WO | WO 01/29587 | 4/2001 |

OTHER PUBLICATIONS

Hawley's Condensed Chemical Dictionary, 14th Edition, 2002.*
UNIFRAX, Material Safety Data Sheet of Refractory Ceramic Fiber Product [online] Mar. 9, 2004 [retrieved on Sep. 26, 2005]. Retrieved from the internet: < URL <http://www.UNIFRAX.com/MSDSAPPR.NSF/0/4B62E969F505CD7985256A11006DCAAE?OpenDocument>.*
Brochure by Carborundum Company entitled Insulfrax® Speciality Glass Fiber Product Specification, 8 pages (Mar. 1993).*
UNIFRAX, Product Information Sheet, Fiberfrax® Ceramic Fiber, 4 pgs.
Saffil Ha Bulk Fibre Product Data Sheet, High Termperature Insulation, 2 pgs.
Thermal Ceramics, Kaowool® Bulk Fiber product information, 2 pgs.
Thermal Ceramics, Superwool® Bulk and Blanket product information, 2 pgs.
UNIFRAX, Product Information Sheet, Fiberfrax® Ceramic Fiber, 4 pgs, Sep. 2000.
Saffil Ha Bulk Fibre Product Data Sheet, High Temperature Insulation, 2 pgs, Sep. 2001.
Thermal Ceramics, Kaowool® Bulk Fiber product information, 2 pgs, Apr. 2001.
Thermal Ceramics, Superwool® Bulk and Blanket product information, 2 pgs, Oct. 2001.

* cited by examiner

*Primary Examiner*—Vasu Jagannathan
*Assistant Examiner*—Vickey Ronesi
(74) *Attorney, Agent, or Firm*—Carolyn A. Fischer

(57) ABSTRACT

The invention relates to a pavement marking composition comprising ceramic fibers. The ceramic fibers are preferably randomly dispersed within a polymeric material. The polymeric material preferably comprises a substantially non-crosslinked elastomer. The pavement marking composition is preferably formed into a sheet material such as a tape.

26 Claims, No Drawings

PAVEMENT MARKING COMPOSITION COMPRISING CERAMIC FIBERS

RELATED APPLICATIONS

This application claims priority from U.S. provisional patent application Ser. No. 60/325,279 filed Sep. 27, 2001.

FIELD OF THE INVENTION

The invention relates to a pavement marking composition comprising ceramic fibers. The ceramic fibers are preferably randomly dispersed within a polymeric material. The polymeric material preferably comprises a substantially non-crosslinked elastomer. The pavement marking composition is preferably formed into a sheet material such as a tape.

BACKGROUND OF INVENTION

Pavement marking tapes are typically used to delineate the boundaries for lanes of traffic on a roadway. The tape may extend continuously, such as along the outermost boundaries of the driving lanes, or intermittently, such as between lanes. One popular use for such a tape is in construction work zones, where pavement marking tape can guide motorists through new traffic patterns without incident. Typically, the pavement marking tapes are eventually removed from the roadway. To allow the pavement marking tape to be peeled from the surface of the roadway in a single piece, the marking tape must have sufficient structural integrity to prevent tearing. Further, if the tape is intended to remain in place indefinitely, it is necessary to provide structural integrity sufficient to withstand the abuse that vehicles and weather can impose.

U.S. Pat. No. 4,117,192 (Jorgensen) relates to a pavement marking sheet materials made from deformable, reduced-elasticity polymeric materials that are made retroreflective by adhering to the sheet material a thin support film having retroreflective elements partially embedded in it. The exemplified sheet material contains 23 parts by weight acrylonitrile-butadiene elastomer precursor, 19.6 parts chlorinated paraffin, 27.6 parts "Asbestos RG 144", 29.9 parts titanium dioxide, 4.6 parts synthetic silica, and 0.8 parts stearic acid.

U.S. Pat. No. 4,282,281 relates to a longer-lived pavement marking that is provided by adhering to the pavement a sheet material about one fourth millimeter or more thick that comprises a carboxyl-modified acrylonitrile-butadiene polymer and particulate fillers dispersed in the polymer. The exemplified sheet material contains 13.53 parts by weight carboxyl-modified acrylonitrile-butadiene elastomer precursor having 5 weight-percent carboxyl functionality, 11.5 parts by weight chlorinated paraffin, 17.59 parts by weight titanium dioxide, 0.07 parts by weight Ultramarine blue pigment, 16.24 parts by weight asbestos ("Calidria RG-100"), 0.48 parts by weight stearic acid, 2.71 parts by weight hydrated silica, and 37.89 parts by weight glass microspheres averaging 200 micrometers in diameter treated with 550 parts per millions of an aminosilane. Others sorts of particulate or fibrous fillers may also be used, such as clay, talc, wood flock or glass fiber.

According to U.S. Pat. No. 5,373,465 (Fulcomer) "Asbestos fibers contribute importantly to the desired properties of the sheet material, but for toxicity reasons, use of such fibers has been virtually eliminated for many applications. Alternative fillers, such as polyethylene fibers as disclosed in U.S. Pat. No. 4,490,432 to Jordan, or reinforcing cellulose fibers, as disclosed in U.S. Pat. No. 5,139,590 to Wyckoff may substitute for asbestos filling material."

U.S. Pat. No. 4,490,432 (Jordan) relates to a pavement-marking sheet material which comprises a non-crosslinked elastomeric precursor such as acrylonitrile-butadiene polymer; a thermoplastic polymer such as polyethylene which reinforces the sheet material, e.g., by orientation of the thermoplastic polymer so that the calendered product exhibits greater tensile strength downweb than crossweb; and a particulate inorganic filler, which preferably includes platelet-type fillers such as talc, mica, or magnesium silicate.

SUMMARY OF THE INVENTION

It has since been discovered that pavement marking sheets having a greater tensile strength in one direction (e.g. downweb) versus the other direction (e.g. crossweb) tend to result in reduced conformability and reduced shear resistance. This differential in strength can result in the pavement marking sheet breaking away from the pavement to which it was applied. Accordingly, industry would find advantage in pavement marking compositions and sheet materials that comprise a composition having similar downweb and crossweb tensile strength, yet are substantially free of asbestos. The Applicants have discovered that such a combination of physical properties can be provided by a pavement marking composition comprising ceramic fibers dispersed within a polymeric material. The pavement marking composition of the invention comprises ceramic fibers dispersed within a polymeric material. The fiber length of at least 50% by weight of the ceramic fibers in the pavement marking is at least about 5 microns and preferably at least 20 microns. The composition is substantially free of fibers having a fiber length of less than 1 micron. The ceramic fibers have an average diameter ranging from about 1 to about 4 microns. In one embodiment, the ceramic fibers comprise at least about 10 weight-% aluminum oxide, preferably at least 20 weight-% aluminum oxide, and more preferably at least about 30 weight-% aluminum oxide. In another embodiment, the ceramic fibers comprises comprise at least about 55 weight-% silicon dioxide and at least about 20 weight-% calcium oxide. The ceramic fibers preferably have a melt point of greater than about 1000° C., more preferably greater than about 1200° C. and most preferably greater than about 1500° C.

The pavement marking composition is preferably formed into a sheet having a thickness ranging from about 0.25 mm to about 5 mm. The absolute value of the ratio of the downweb tensile to crossweb tensile of the sheet is preferably less than about 3 and more preferably less than about 2.5. The absolute value of the ratio of the downweb elongation to crossweb elongation of the sheet is preferably less than about 5 and more preferably less than about 3. The absolute value of the ratio of the average downweb tear to average crossweb tear is preferably less than about 2 and more preferably less than about 1.5.

The ceramic fibers may be dispersed in a planar orientation, yet are preferably randomly dispersed within the polymeric material throughout the sheet.

The pavement marking composition preferably comprises:

a) from about 0.2 weight-% to about 50 weight-% ceramic fiber;

b) from about 5 weight-% to about 50 weight-% polymeric material; and c) from 0 to about 75 weight-% of other ingredients selected from reflective elements, extender resins, fillers and pigments; based on the total weight of the pavement marking composition.

The polymeric material preferably ranges from about 10 to about 30 weight-% and the ceramic fiber preferably ranges from about 5 to about 20 weight-%, particularly in the case wherein the polymeric material is a substantially non-crosslinked elastomer. In the case of thermoplastic polymeric materials, the ceramic fiber preferably ranges from about 0.25 to about 10 weight-%. The composition preferably comprises from about 30 to about 50 weight-% reflective elements. The reflective elements are preferably glass microspheres or cube-corner retroreflective sheeting. The composition preferably comprises from about 5 to about 30 weight-% of an extender. The polymeric material preferably comprises a substantially non-crosslinked elastomer, such as acrylonitrile-butadiene, or a thermoplastic elastomer.

In another embodiment, the present invention is a pavement surface comprising the inventive pavement marking sheet.

DETAILED DESCRIPTION OF THE PREFERRED EMBODIMENT

The ceramic fibers for use in the invention are different from asbestos. Asbestos is a naturally occurring mineral that is mined. It differs from other minerals in its crystal development. Asbestos is divided into two mineral groups—serpentine and amphibole. The division is based upon the crystalline structure. Serpentines have a sheet or layered structure while amphiboles have a chain-like structure. As the only member of the serpentine group, chrysotile, also known as "white asbestos", is the most common type of asbestos found in building materials wherein it was formerly used as an insulator and/or fire retardant. Chrysotile fibers can be extremely thin, the unit fiber having a diameter of approximately 0.025 microns. The chemical composition of chrysotile is typically 37–44% $SiO_2$, 39–44% MgO, 0–6% FeO, 0.1–5% $Fe_2O_3$, 0.2–1.5% $Al_2O_3$, trace-5% CaO, 12–15% water (hydrated oxides). In the amphibole group there are five types of asbestos—amosite (i.e. brown asbestos), crocidolite (i.e. blue asbestos) and the more rare types of anthophyllite, tremolite and actinolite, that are found mainly as contaminants in other minerals. Amosite has a typical chemical composition of 49–53% $SiO_2$, 1–7% MgO, 34–44% FeO, 0–0.4% $K_2O$, trace $Na_2O$, 2.5–4.5% water; whereas crocidolite is typically 49–53% $SiO_2$, 0–3% MgO, 13–20% FeO, 0.1–5% $Fe_2O_3$, 0–0.2% $Al_2O_3$, 0.3–2.7% CaO, 0–0.4% $K_2O$, 4–8.5% $Na_2O$ and 2.5–4.5% water. As reported in the literature; chrysotile, amosite crocidolite and anthophyllite have a fiber length distribution wherein at least 36% of the sample comprises fibers of less than 1 micron.

The ceramic fibers for use in the invention are man made, rather than naturally occurring. Since the ceramic fibers are manufactured, the fiber length and fiber diameter can be controlled to be within a specified range. Although the fiber length can be considerably longer prior to combining the ceramic fibers with the polymeric material, the fiber length of at least 50% by weight of the fibers in the pavement marking is greater than about 5 microns. Further, at least 50% by weight of the fibers are greater than about 10 microns, more preferably greater than about 20 microns, even more preferably greater than about 40 microns, and most preferably greater than about 50 microns. The ceramic fibers for use in the invention are substantially free (i.e. less than 5% by weight) of fibers having a fiber length of less than 1 micron. The fiber diameter tends to range from about 1 micron to about 4 microns with about 1.5 to about 3 microns being preferred. The aspect ratio (i.e. ratio of length to diameter) of at least 50% by weight of the preferred ceramic fibers for use in the invention is typically at least 20:1 and preferably 40:1. Man made ceramic fibers tend to comprise a major amount of $Al_2O_3$ or $SiO_2$ in combination with CaO. The amount of $Al_2O_3$ is typically at least about 10% by weight, preferably at least about 20%, more preferably at least 40% and most preferably ranging from about 45% to 90% by weight, or greater. Alternatively, the amount of $SiO_2$ is typically at least 55% by weight and preferably greater than about 60%, in combination with greater than about 20% by weight CaO. The ceramic fibers may be comprised of other inorganic oxides, as well, provided the fibers contribute the improvement in properties concurrently with the avoidance of appreciable amounts of fiber having a length of less than 1 micron.

The ceramic fibers for use in the invention are also different from fiberglass (i.e. glass fibers). According to *The America Heritage Dictionary*, 3rd Ed., Houghton Mifflin Company, Boston, glass is defined as "Any of a large class of material with highly variable mechanical and optical properties that solidify from a molten state without crystallization, are typically made by silicate fusing with boric oxide, aluminum oxide or phosphorous pentoxide, are generally hard, brittle and transparent or translucent, and are considered to be supercooled liquids rather than true solids." In contrast, ceramic materials are typically devitrified, i.e. caused to become crystalline and brittle by firing at high temperatures. It is the presence of such crystalline and typically microcystalline structure, as can be detected with x-ray defraction, that distinguishes ceramic fibers from glass fibers. The melt point of ceramic fiber tends to be indicative of the presence of such crystallinity. Whereas, glass tends to melt at 700–800° C., the ceramic fibers for use in the pavement marking of the invention tend to have melt point of greater than about 1000° C. Typically, the melt point is greater than about 1200° C. and preferably greater than about 1500° C. Alternatively, ceramic fibers may not necessarily be devitrified, but rather comprises a high concentration of $Al_2O_3$, or other transition metal oxide that contributes the desired properties (e.g. fiber length distribution, aspect ratio, melt point) as previously described.

Ceramic fibers for use in the invention include ceramic fibers commercially available from SAFFIL Ltd, Cheshire, UK under the trade designation "SAFFIL ALUMINA FIBERS". Such fibers are produced in a spinning process from a viscous aqueous solution to give a narrow diameter distribution. They are then subjected to a controlled heat treatment to develop a polycrystalline microstructure. The chemical compositions of the 1600 HA Grade Bulk is 95–97% aluminum oxide, 3–5% silica and less than 0.5% of other trace elements. The melt point is greater than 2000° F. (1093° C.) and the median fiber diameter is 3.0 to 3.5 microns.

Another ceramic fiber includes ceramic fibers commercially available from Unifrax Corporation, Niagara Falls, N.Y. under the trade designation "FIBERFAX". These ceramic fibers are available in four grades. The High Purity grade contains 47–52% aluminum oxide and 48–53% silicone dioxide. The Kaolin grade is manufactured from kaolin clay and thus contains a higher level of impurities such as $Fe_2O_3$, $TiO_2$ and $Na_2O$. The AZS grade contains 29–31% aluminum oxide, 53–55% silicone dioxide, and 15–17% zirconium dioxide, whereas the Mullite grade contains 72–75% aluminum oxide and 25–28% silicone dioxide. These fibers are surmised to be produced using blown fiber techniques. One indicative feature of blown fibers is the presence of fractured fiber ends.

Preferred ceramic fiber includes ceramic fibers commercially available from Thermal Ceramics Inc., Augusta, Ga. under the trade designations "REFRACTORY CERAMIC FIBER KAOWOOL HA BULK" and "SUPERWOOL 607". The chemical composition of "KAOWOOL HA BULK" is 49–53% aluminum oxide, 47–51% silica and a minor amount of other oxide impurities. The target fiber diameter ranges from 2.15 to 3.5 microns with a target of 2.83 microns. The "SUPERWOOL 607" ceramic fiber comprises 60–70% silicone dioxide, 25–35% calcium oxide, 4–7% magnesium oxide and trace amounts of aluminum oxide.

In the pavement marking composition of the invention the ceramic fibers are incorporated into a polymeric material. Typically the ceramic fibers are admixed with the polymeric material forming a relatively homogeneous mixture, wherein the ceramic fibers are dispersed randomly three-dimensionally throughout the polymeric material. A high shear mixer is suitable for this purpose. Alternatively, in forming a sheet the ceramic fibers can be deposited in a substantially planar orientation.

The pavement marking composition generally comprises at least 0.2 weight-% ceramic fiber, but no more than about 50 weight-%. For non-crosslinked elastomer polymeric material, the preferred concentration of ceramic fiber generally ranges from about 3 to about 20 weight-%, based on the total weight of the pavement marking composition. In the case of thermoplastic polymeric materials, the preferred amount of ceramic fiber ranges from about 0.2 to about 10 weight-%. The amount of polymeric material is typically at least about 5 weight % and usually no more than about 50 weight-%. The amount of polymeric material preferably ranges from about 10 weight-% to about 30 weight-%. The pavement marking composition may optionally comprises up to about 75 weight-% of other ingredients selected from reflective elements (e,g, glass beads), extender resins, fillers and pigment. The proportions can be varied within the stated ranges depending upon the amount of other ingredients included in the composition, especially the amount and kind of optional fillers.

The polymeric material comprises a thermoplastic material or a substantially non-crosslinked elastomer precursor. The elastomer precursor may partially crosslink when thermally blended with the ceramic fibers and other optional ingredients as well as when extruded into a sheet. Although the elastomer precursors are typically initially thermally blended, due to the crosslinking such compositions are characteristically non-thermoplastic once formed into a sheet.

In addition to the ceramic fibers, the pavement marking composition may further comprise other fibers, and in particular thermoplastic organic fibers such as polyester fibers, polyolefin fibers, and mixtures thereof. However, in order to maintain the improved balance between the downweb and crossweb tensile, elongation and tear properties, the concentration of such non-ceramic fibers is less than 5 weight-% and preferably about 0.1 weight-% to about 1.0 weight-%. The inclusion of a low concentration of such fibers can advantageously raise the tensile by as much as 50% without substantially compromising the ratio of downweb to crossweb strength.

The polymeric material provides a viscoelastic character, which permits absorption of the forces and pressures of wheeled road traffic without creating internal forces that tend to remove the marking from the roadway. Acrylonitrile-butadiene polymers are especially desirable elastomer precursors because they offer a high degree of oil resistance. Other useful non-crosslinked elastomer precursors which offer good oil resistance include neoprene and polyacrylates. Natural rubber and styrene-butadiene polymers may also be used. Extender resins, preferably halogenated polymers such as chlorinated paraffins, but also hydrocarbon resins or polystyrenes, are preferably included with the non-crosslinked elastomer precursor ingredients, and are miscible with, or form a single phase with, the elastomer precursor ingredients. Such extender resins account for up to about 20 weight-% and preferably about 10 weight-% of the pavement marking composition of the invention.

As disclosed in U.S. Pat. No. 5,536,569 (Lasch et al.), incorporated herein by reference, preferred thermoplastic materials, particularly for instances wherein the thermoplastic material comprises reflecting elements and/or skid-resistant particles on the exposed pavement marking surface, include acid containing ethylene copolymers. Representative acid containing ethylene copolymers include ethylene acrylic acid (EAA) copolymers and ethylene methacrylic acid (EMAA) copolymers, and mixtures of EAA and EMAA; as well as ionically cross-linked EMAA. Alternative thermoplastic materials, although less preferred for the topmost layer, include ethylene n-butyl acrylate (EnBA), ethylene vinyl acetate (EVA) and blends thereof, as well as polyolefins.

Particularly preferred thermoplastic materials include EMAA polymer commercially available from the E.I. Dupont de Nemours and Company (Dupont) of Wilmington, Del. under the trade designation "NUCREL" and ionically cross-linked ethylene methacrylic acid (EMAA) ionomers available from Dupont under the trade designation "Surlyn".

Fillers are generally included in the composition at least for the purpose of enhancing the visibility of the exposed top layer. However, fillers also advantageously enhance properties such as reinforcement, extending, surface hardness, and abrasion resistance. Platelet fillers, i.e., fillers having a plate-like shape, such as magnesium silicate, talc, or mica, have been found to contribute the best abrasion resistance and downweb strength properties. Also the platelet fillers make the sheet material harder, which contributes to maintaining a white appearance on the roadway. In addition, the platelet fillers have a high ratio of surface area to volume, which enhances their reinforcing ability. Other fillers, such as needle-type or bead-type fillers, may be employed instead of or in addition to low concentrations of platelet fillers. The amount of filler included in the sheet material of the invention varies with the kind of filler used. Preferably, at least 3 weight-% of platelet fillers are used. With lower amounts of ceramic fibers, higher amounts of filler are typically desired though fillers in an amount of more than 50 weight-% tend to stiffen the product excessively. Best results have been achieved with amounts of fillers between about 5 and about 20 weight-%.

After mixing, the composition is processed on calendering rolls where the composition forms a smooth band and are processed into thin sheets of the desired thickness. Generally sheets are formed having a thickness of at least about ¼ millimeter, and preferably at least about 1 millimeter, but generally the sheets are less than about 5 millimeters thick, and preferably less than 3 millimeters thick. The sheet may be embossed as described in U.S. Pat. Ser. No. 4,988,541; incorporated herein by reference.

Retroreflective elements (e.g. transparent microspheres, cube-corner particles derived from ground sheeting) or and skid-resisting particles (e.g. sand particles) are also preferably included in the sheet material of the invention at concentration up to about 45 weight-% to provide reflectivity at night and to give the sheet material skid-resisting qualities. Preferably, about 25 weight-% to about 40 weight-% reflective glass beads are dispersed throughout the thickness of the pavement marking sheet. An exterior layer of such particles may be provided on the top of the sheet material, partially embedded in the sheet material and partially protruding from the sheet material, to provide immediate reflectivity and skid-resistance; and other particles may be embedded in the sheet material to become exposed as the sheet material is worn away. The particles may be held in the partially protruding position by use of a support film adhered to the sheet material of the invention, for example, as taught in column 4 of U.S. Pat. No. 4,988,541; incorporated herein by reference.

Alternatively, yet typically less durable, retroreflective properties may be provided by bonding retroreflective sheeting on the exposed surface of the pavement marking. The two most common types of retroreflective sheeting are microsphere-based sheeting and cube corner-based sheeting. Microsphere sheeting, sometimes referred to as "beaded sheeting," is well known to the art and includes a multitude of microspheres typically at least partially embedded in a binder layer, and associated specular or diffuse reflecting materials (such as metallic vapor or sputter coatings, metal flakes, or pigment particles). "Enclosed-lens" based sheeting refers to retroreflective sheeting in which the beads are in spaced relationship to the reflector but in full contact (i.e. covered) with resin. The "encapsulated lens" retroreflective sheeting is designed such that the reflector is in direct contact with the bead but the opposite side of the bead is in a gas interface. Illustrative examples of microsphere-based sheeting are disclosed in U.S. Pat. Nos. 4,025,159 (McGrath); 4,983,436 (Bailey); 5,064,272 (Bailey); 5,066,098 (Kult); 5,069,964 (Tolliver); and 5,262,225 (Wilson).

The sheet comprising the ceramic fibers within a polymeric material in combination with other optional ingredients such as retroreflective elements (e.g. glass beads), filler, pigment, etc. preferably exhibits certain properties. In general, the sheet material of the invention has a downweb tensile strength of at least 5 kilograms per square centimeter at 25° C., and preferably at least 10 kilograms per square centimeter. In order to exhibit improved conformability and shear resistance, particularly in comparison to pavement marking sheet materials having polyester and polyethylene fibers, the kind and amount of ingredients are preferably chosen such that the tensile and elongation properties as well as the tear strength are approximately the same in the downweb direction as in the crossweb direction. The absolute value of the ratio of the downweb tensile to crossweb tensile, as measured according to ASTM D82 is preferably less than about 3. More preferably, the absolute value of the ratio of the downweb tensile to crossweb tensile of the pavement marking sheet is less than about 2.5. Alternatively, or in addition thereto, the absolute value of the ratio of the downweb elongation to crossweb elongation is preferably less than about 5 and more preferably less than about 3. Further, or in the alternative, the absolute value of the ratio of the downweb average tear strength of the pavement marking sheet to crossweb tear strength is less than about 2 and preferably less than about 1.5 when measured according to ASTM 1938.

Although the composition exhibits such preferred properties and generally has sufficient strength alone, the pavement marking may optionally comprise a scrim, such as described in U.S. Pat. No. 5,981,033 incorporated herein by reference. The marking tape, and in particular the surface layer that contacts the pavement, is preferably conformable, meaning that it conforms to irregularities in the surface to which the tape is attached. As described in U.S. Pat. No. 5,194,113, incorporated herein by reference above, conformable marking tapes should be capable of being deformed under reasonable forces in order to take on the shape of the road surface irregularities, and thereby allow formation of a good bond to the road surface. By reasonable forces it is meant that after applying the marking sheet to a road surface and tamping it, the marking tape conforms to the road surface. In such an application, the tamped tape substantially replicates the surface texture of the road.

Conformability of a marking tape can be evaluated in other ways as well. One simple way is to press a layer or sheet of the material by hand against a complex, rough, or textured surface such as a concrete block or asphalt composite pavement, remove the sheet, and observe the degree to which the surface has been replicated in the sheet. Another assessment of the conformance of a marking tape may be obtained as follows. First, the force required to deform the sheet material a suitable amount is measured. Second, a portion of the induced strain is relieved. Finally, the retractive force remaining in the material at the reduced strain level is measured. A specific example of this process would be to deform a sample to 115% of its original length by stretching the sample at a strain rate of $0.05 \text{ sec}^{-1}$ and measuring the stress at 115% deformation, release the strain at the same rate, allow the material to return to 110% of its original length, and measure the retractive force. This measurement may be made using a standard tensile testing apparatus such as, for example, the servohydraulic tensile testers available from MTS Systems Corporation of Minneapolis, Minn. Preferred comfortable materials exhibit a force to deform the sample to 115% of its original length of less than 35 NT per cm width (20 lbs per inch width), and a retractive force at a subsequent 110% deformation of less than 14 NT per cm width (8 lbs per inch width), although lesser forces are even more preferred. Other measures of conformability are described in U.S. Pat. No. 5,194,113, and may also be used in conjunction with the pavement marking tapes of the present invention to evaluate conformance of a sheet material to an irregular surface.

The pavement marking tape typically has a water vapor transmission rate (WVTR) of at least 2 $g/m^2/day$ according to ASTM F1249. The WVTR is preferably at least 5 $g/m^2/day$, more preferably at least 10 $g/m^2/day$, even more preferably at least 20 $g/m^2/day$ and most preferably about 30 $g/m^2/day$ or higher. This insures that water does not become permanently trapped along the interface between the tape and the pavement. The sheet material also preferably has good abrasion resistance as may be indicated by a modified Taber abrasion test. The test uses an H-22 Taber abrader wheel, with a one kilogram weight on the wheel. The test specimen is held under water, and the abrader wheel passed over the specimen for 500 cycles. Sheet material of the invention generally exhibits a loss of no more than about 5 grams in this test.

Pavement marking compositions of the invention are especially useful in sheets or tapes having an embossed top surface to improve reflectivity and other properties. Such as embossed sheeting is described in U.S. Pat. No. 4,388,359 and other embossed forms of pavement marking sheet material are also taught in the art.

The pavement marking sheet or tapes typically comprise a pressure sensitive adhesive for bonding the sheet to a roadway surface. Suitable adhesive compositions may comprises a wide variety of non-thermoplastic hydrocarbon elastomers including, natural rubber, butyl rubber, synthetic polyisoprene, ethylene-propylene rubber, ethylene-propylene-diene monomer rubber (EPDM), polybutadiene, polyisobutylene, poly(alpha-olefin) and styrene-butadiene random copolymer rubber. These elastomers are distinguished from thermoplastic elastomers of the block copolymer type such as styrenic-diene block copolymers which have glassy end blocks joined to an intermediate rubbery block. Such elastomers are combined with tackifiers as well as other optional adjuvants. Examples of useful tackifiers include rosin and rosin derivatives, hydrocarbon tackifier resins, aromatic hydrocarbon resins, aliphatic hydrocarbon resins, terpene resins, etc. Typically the tackifier comprises from 10 to 200 parts by weight per 100 parts by weight of the elastomer. Such adhesive composition are preferably prepared according to the method described in U.S. Pat. Nos. RE 36,855 and 6,116,110, incorporated herein by reference.

Other preferred adhesive compositions include acrylate based pressure sensitive adhesive composition such as described in further detail in WO 98/24978 published Jun. 11, 1998 that claims priority to U.S. Ser. Nos. 08/760,356 and 08/881,652, incorporated herein by reference. Preferred acrylate based adhesive compositions include four types of compositions, namely i) compositions comprising about 50 to 70 weight-% polyoctene and about 30 to 40 wt-% tackifier; ii) compositions comprising about 60 to 85 wt-% isooctyl acrylate, about 3 to 20 wt-% isobornyl acrylate, about 0.1 to 3 wt-% acrylic acid and about 10 to 25 wt-% tackifier; iii) compositions comprising about 40 to 60 wt-% polybutadiene and about 40 to 60 wt-% tackifier; and iv) compositions comprising 40 to 60 wt-% natural rubber and about 40 to 60 wt-% tackifier.

Objects and advantages of the invention are further illustrated by the following examples, but the particular materials and amounts thereof recited in the examples, as well as other conditions and details, should not be construed to unduly limit the invention. All percentages and ratios herein are by weight unless otherwise specified.

EXAMPLES

Table I, as follows, identifies the chemical description, trade designation, supplier and location for each of the ingredients employed in the examples.

TABLE I

| Chemical Description | Trade Designation | Supplier | Location |
| --- | --- | --- | --- |
| Acrylonitrile-butadiene, non-crosslinked elastomer precursor | "NIPOL 1022" | Zeon Chemicals Incorporated | Louisville, KY |
| Ethylene Acrylic Acid Copolymer | "AC 5120" | Allied Signal | Morristown, NJ |
| Ceramic Fiber | "KAOWOOL HA BULK" | Thermal Ceramics | Augusta, GA |
| Ceramic Fiber | "SUPER WOOL 607" | Thermal Ceramics | Augusta, GA |
| Asbestos | "RG- 144" | Union Carbide | |
| Talc - Platelet Filler, Processing Aid | "MISTRON SUPERFROST" | Luzenac America, Inc. | Englewood, CO |
| Antioxidant | "SANTO WHITE CRYSTALS" | Flexsys America | Akron, OH |
| Chlorinated Paraffin - Extender | "CHLOREZ 700S" | Dover Chemical | Dover, OH |
| Chlorinated Paraffin - Extender | "PAROIL 140" | Dover Chemical | Dover, OH |
| Silica Hydrated Amorphous - Filler | "HI SIL 233" | PPG Industries Inc. | Pittsburg, PA |
| Stearic Acid - Processing Aid | "INDUSTRENE R" | Humko Chemical Division of Witco Corp. | Memphis, TN |
| Chelating agent | "VANSTAY SC" | R.T. Vanderbilt Co. Inc. | Norwick, CT |
| Ultramarine Blue | "BLUE UM 5016" | Whittaker, Clark and Daniels, Inc | Plainfield, IL |
| Glass Beads - Filler, Retroreflective Element | "GLASS BEADS AD" | Flex-O-Lite | Muscatine, IA |
| $TiO_2$ - Pigment | "TI PURE 960" | DuPont | Wilmington, DE |
| Polyethylene Fiber | "13038F" | Mini Fibers Inc. | Johnson City, TN |
| Polyester Fiber | "6-3025" | Mini Fibers Inc. | Johnson City, TN |
| $TiO_2$ - Pigment | "CR-880" | Kerr McGee Chemical Inc. | Oklahoma City, OK |
| Glass Beads - Filler, Retroreflective Element | "70-230" | Cataphote Inc. | Jackson, MS |

Tables II–IV as follows sets forth the weight percentage of each ingredient employed in Comparative Examples A–D, and Examples 1–9.

TABLE II

| Ingredient | Comparative Example A | Comparative Example B | Example 1 | Example 2 | Example 3 |
|---|---|---|---|---|---|
| "NIPOL 1022" | 13.53 | 13.51 | 12.06 | 10.54 | 14.01 |
| "MISTRON SUPERFROST" | 6.77 | | 6.03 | 5.27 | 3.49 |
| "6-3025" | 1.35 | | | | 0.53 |
| "13038F" | 2.71 | | | | |
| "RG-144" | | 16.22 | | | |
| "KAOWOOL HA Bulk" | | | 12.49 | 22.20 | 10.68 |
| "SANTO WHITE CRYSTALS" | 0.13 | | 0.12 | 0.11 | 0.14 |
| "CHLOREZ 700S" | 9.47 | 9.46 | 8.44 | 7.38 | 9.80 |
| "HI SIL 233" | 2.71 | 2.70 | 2.41 | 2.11 | 2.80 |
| "INDUSTRENE R" | 0.13 | 0.47 | 0.12 | 0.11 | 0.14 |
| "VANSTAY SC" | 0.07 | 0.07 | 0.06 | 0.05 | 0.07 |
| "PAROIL 140" | 0.68 | 2.06 | 0.60 | 0.53 | 0.70 |
| "BLUE UM 5016" | 0.07 | 0.07 | 0.06 | 0.05 | 0.07 |
| "MISTRON SUPERFROST" | 6.77 | | 6.03 | 5.27 | |
| "GLASS BEADS AD" | 37.89 | 37.86 | 33.78 | 29.51 | 39.22 |
| "TI PURE 960" | 17.59 | 17.57 | 15.68 | 13.70 | 18.21 |
| "SANTO WHITE CRYSTALS" | 0.13 | | 0.12 | 0.11 | 0.14 |

TABLE III

| Ingredient | Example 4 | Example 5 | Comparative Example C | Example 6 | Example 7 |
|---|---|---|---|---|---|
| "NIPOL 1022" | 12.69 | 12.65 | 12.57 | 21.32 | 12.65 |
| "KAOWOOL HA BULK" | 9.68 | 9.65 | 9.59 | 16.26 | |
| "SUPER WOOL 607" | | | | | 9.65 |
| "MISTRON SUPER FROST" | 6.35 | 6.33 | 6.29 | 10.66 | 6.33 |
| "6-3025" | 0.32 | 0.64 | 1.28 | .81 | 0.64 |
| "SANTO WHITE CRYSTALS" | 0.13 | 0.13 | 0.13 | .21 | 0.13 |
| "CHLOREZ 700-S" | 8.89 | 8.86 | 8.80 | 14.93 | 8.86 |
| "HISIL 233" | 2.54 | 2.53 | 2.51 | 4.27 | 2.53 |
| "INDUSTRENE R" | 0.13 | 0.13 | 0.13 | .21 | 0.13 |
| "VANSTAY SC" | 0.06 | 0.06 | 0.06 | 14.92 | 0.06 |
| "PAROIL 140" | 0.63 | 0.63 | 0.63 | 4.26 | 0.63 |
| "BLUE UM 5016" | 0.06 | 0.06 | 0.06 | .21 | 0.06 |
| "MISTRON SUPERFROST" | 6.35 | 6.33 | 6.28 | 0.10 | 6.33 |
| "70-230" | 35.54 | 35.43 | 35.20 | 1.08 | 35.43 |
| "CR-880" | 16.5 | 16.44 | 16.34 | 0.10 | 16.44 |
| "SANTO WHITE CRYSTALS" | 0.13 | 0.13 | 0.13 | 10.66 | 0.13 |

TABLE IV

| Ingredient | Example 8 | Comparative Example D | Example 9 |
|---|---|---|---|
| "NIPOL 1022" | 39.56 | | |
| "AC 5120" | | 82.3 | 81.9 |
| "KAOWOOL HA BULK" | 30.18 | | 0.4 |
| "CHLOREZ 700-S" | 27.69 | | |
| "INDUSTRENE R" | 0.39 | | |
| "VANSTAY SC" | 0.19 | | |
| "PAROIL 140" | 1.98 | | |
| "TI PURE 960 | | 17.7 | 17.7 |

A Banbury high shear mixer, set at a temperature of 180° F. (82° C.) was used to prepare each of the examples. Each formulation was prepared by first charging the mixer with the polymeric material and fibers. After mixing for about 1 minute at a rate of 32 rpm, the ingredients were added sequentially, as listed in the tables, up until and including the second addition of talc. The ingredients were mixed for about 1 minute. The last three remaining ingredients were then added. Mixing was continued for about 3 minutes until the temperature reached 240° F. (116° C.). The heated mixture was then dropped out of the mixer onto calender rolls and fanned into a sheet having a thickness of about 1.4 mm.

During mixing of Examples 1 and 2 exhibited a 0 amperage draw, reflecting an easily sheared mixture in comparison to Comparative Example A that required a 60 amperage draw to compound the mixture. Advantageously, the compositions comprising ceramic fibers were prepared in one pass through the Banbury, whereas the formulation having polyethylene or polyester fibers typically required two passes to obtain a uniform mixture.

For each of the examples the tensile and elongation properties of the samples were evaluated according to ASTM D 82. Further, the tear strength was evaluated according to ASTM D1938.

Table V, as follows sets forth the test results:

1.28 weight-% polyester fiber in Comparative Example C, increased the ratio of downweb tensile to crossweb tensile to 3.95, outside the desired range.

Example 8 exemplifies a composition suitable for use as a base conformance layer. Typically a second layer such as an optical layer (e.g. binder and glass beads), abrasion resistant layer, pigmented layer, etc. is applied to the viewing surface during the preparation of the pavement marking sheet.

TABLE V

| Example | DW Tensile lb/in² (kg/cm²) | DW Elong. (%) | CW Tensile lb/in² (kg/cm²) | CW Elong. (%) | DW Avg Tear lb (kg) | CW Avg Tear lb (kg) |
|---|---|---|---|---|---|---|
| Comp. A | 701 (49.3) | 145 | 162 (11.4) | 1254 | 4.820 (2.191) | 2.583 (1.174) |
| Comp. B | 198 (13.9) | 281 | 180 (12.7) | 493 | 5.164 (2.347) | 4.167 (1.894) |
| Example 1 | 178 (12.5) | 642 | 121 (8.51) | 1454 | 2.605 (1.184) | 2.209 (1.064) |
| Example 2 | 133 (9.35) | 568 | 87 (6.1) | 1278 | 2.105 (.9568) | 1.703 (.7741) |
| Example 3 | 161 (11.2) | 257 | 69 (4.8) | 1107 | 2.3 (1.1) | 1.09 (.49) |
| Example 4 | 224 (15.75) | 560 | 114 (8.01) | 1880 | | |
| Example 5 | 311 (25.52) | 349 | 113 (7.88) | 1560 | 2.501 (1.127) | 1.481 (.6665) |
| Comp. C | 510 (35.9) | 189 | 129 (9.07) | 1771 | | |
| Example 6 | 311 (21.9) | 383 | 150 (10.6) | 1690 | | |
| Example 7 | | | | | 3.218 (1.448) | 1.738 (0.782) |
| Example 8 | | | | | 1.297 (1.035) | .985 (0.443) |
| Example 9 | | | | | 2.30 (1.04) | 2.12 (.954) |
| Comp. D | | | | | 1.567 (0.705) | 1.779 (0.800) |

DW - downweb (machine direction)

CW—crossweb

Elong.—elongation

Examples 1–7 and Comparative Examples A–C depict pavement marking compositions comprising a substantially non-crosslinked elastomer as the polymeric material. Comparative Examples A and C comprise polyester fibers, whereas Comparative Example B comprises asbestos fibers. Examples 8–9 and Comparative Example D exemplify thermoplastic pavement marking compositions comprising a thermoplastic polymeric material.

In Comparative Example A, the downweb tensile was four times greater than the downweb tensile. Further the crossweb elongation was greater than eight times more than the downweb elongation. In Examples 1 and 2, comprising solely ceramic fibers, the downweb tensile was only about 1.5 times greater than the crossweb tensile. Further, the crossweb elongation was only 2 to 2.5 times greater than the downweb elongation. The tear tests showed that Comparative Example B as well as Examples 1–2 had similar tear strength in both the downweb and crossweb direction, whereas in Comparative Example A the downweb tear was about twice that of the crossweb tear.

In Comparative Example C and Examples 3–6, polyester fibers were added to the formulation in combination with the ceramic fibers to demonstrate the effect such fibers have on the tensile, elongation, and tear strength. The presence of Example 9 in comparison to Comparative Example D demonstrates the improvement in strength contributed by adding a small concentration of ceramic fibers to a thermoplastic polymeric material.

The sheets prepared from Examples 5 and Comparative Example A were prepared into tapes by embossing the sheet; applying a binder to the vertically inclined side surfaces of the embossed pattern; and coating the binder with 165 micrometer diameter, 1.75 index of refraction beads, as described in U.S. Pat. No. 4,988,541. The type of binder generally does not affect the conformability. Two-part polyurethane binders formed by reacting polycaprolactone diols and triols with derivatives of hexamethylene diisocyanate are typically used for this purpose. A pressure sensitive adhesive, temporarily covered with a release liner, was applied to the opposing surface. The liner was removed from a 12″ (30 cm) wide by about 12 feet in length (4 m) piece of each tape and the tapes were adhered side by side on a road surface. A "RTC-2 Roller Tamper Cart" commercially available from Minnesota, Mining and Manufacturing, St. Paul, Minn. having four 50 lb. (22.5 kg) weights was passed over the center portion of the abutted tapes such that about half of each tape was subjected to the tamping. Comparative Example A was observed to be conformable to the extent that the tape conformed to large surface irregularities that protruded above the average surface plane of the road surface by about 0.5 cm. Example 4 was observed to be more conformable than Comparative Example A in the tape was observed to conform to small surface irregularities in addition to the relatively large surface irregularities.

What is claimed is:

1. A pavement marking sheet comprising 5 weight-% to about 20 weight-% ceramic fibers dispersed within 10 weight-% to 30 weight-% of a substantially non-crossliniked elastomer precursor, and 30 weight-% to 50 weight-% reflective elements wherein the ceramic fibers have a melt point of greater than about 1000° C. and the sheet is conformable and has a downweb to crossweb tensile ratio having an absolute value of less than 3 for a thickness ranging from about 0.25 mm to about 5 mm.

2. The pavement marking sheet of claim 1 wherein at least 50% of the fibers have a fiber length of at least about 5 microns.

3. The pavement marking sheet of claim 1 wherein said composition is substantially free of fibers having a length of less than 1 micron.

4. The pavement marking sheet of claim 1 wherein at least 50% of the fibers have a fiber length of at least about 20 microns.

5. The pavement marking sheet of claim 1 wherein the ceramic fibers have an average diameter ranging from about 1 to about 4 microns.

6. The pavement marking sheet of claim 1 wherein the ceramic fibers have an average diameter ranging from about 1.5 to about 3 microns.

7. The pavement marking sheet of claim 1 wherein at least 50% of the fibers have an aspect ratio of at least 20:1.

8. The pavement marking sheet of claim 1 wherein the ceramic fibers comprise at least about 10% by weight aluminum oxide.

9. The pavement marking sheet of claim 1 wherein the ceramic fibers comprise at least about 20% by weight aluminum oxide.

10. The pavement marking sheet of claim 1 wherein the ceramic fibers comprise at least about 30% by weight aluminum oxide.

11. The pavement marking sheet of claim 1 wherein the ceramic fibers comprise at least about 55% by weight silicon dioxide and at least about 20% by weight calcium oxide.

12. The pavement marking sheet of claim 1 wherein the ceramic fibers have a melt point of greater than about 1200° C.

13. The pavement marking sheet of claim 1 wherein the ceramic fibers have a melt point of greater than about 1500° C.

14. The pavement marking sheet of claim 1 wherein the tensile ratio has an absolute value of less than about 2.5.

15. The pavement marking sheet of claim 1 wherein the sheet has a downweb to crossweb elongation ratio having an absolute value of less than about 5 for a thickness ranging from about 0.25 mm to about 5 mm.

16. The pavement marking sheet of claim 15 wherein the elongation ratio has an absolute value of less than about 3.

17. The pavement marking sheet of claim 1 wherein the sheet has a downweb to crossweb tear ratio having an absolute value of less than about 2 for a thickness ranging from about 0.25 mm to about 5 mm.

18. The pavement marking sheet of claim 17 wherein the tear ratio has an absolute value of less than about 1.5.

19. The pavement marking sheet of claim 1 wherein the fibers are randomly dispersed within the substantially non-crosslinked elastomer precursor throughout the sheet.

20. The pavement marking sheet of claim 1 wherein the fibers are dispersed in a planar orientation.

21. The pavement marking sheet of claim 1 wherein the reflective elements are glass microspheres.

22. The pavement marking sheet of claim 1 wherein the reflective elements comprise cube-corner retroreflective sheeting.

23. The pavement marking sheet of claim 1 wherein the composition comprises from about 5 to about 30 weight-% of an extender.

24. The pavement marking sheet of claim 1 further comprising skid-resistant particles.

25. A pavement surface comprising the sheet of claim 1.

26. The pavement marking sheet of claim 1 wherein the sheet is a tape further comprising a pressure sensitive adhesive for bonding the sheet to a pavement surface.

* * * * *